US012212960B1

(12) United States Patent
Krishnamoorthy et al.

(10) Patent No.: US 12,212,960 B1
(45) Date of Patent: Jan. 28, 2025

(54) DYNAMIC ESTABLISHMENT OF TRUST BETWEEN LOCALLY CONNECTED DEVICES

(71) Applicant: Amazon Technologies, Inc., Seattle, WA (US)

(72) Inventors: Shyam Krishnamoorthy, Redmond, WA (US); Lorenzo Tessiore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 17/217,591

(22) Filed: Mar. 30, 2021

Related U.S. Application Data

(63) Continuation of application No. 16/147,352, filed on Sep. 28, 2018, now Pat. No. 10,972,912.

(51) Int. Cl.
*H04W 12/06* (2021.01)
*H04L 9/32* (2006.01)
*H04L 9/40* (2022.01)
*H04W 12/04* (2021.01)

(52) U.S. Cl.
CPC .......... *H04W 12/06* (2013.01); *H04L 9/3247* (2013.01); *H04L 63/0442* (2013.01); *H04L 63/18* (2013.01); *H04W 12/04* (2013.01); *H04L 2209/80* (2013.01)

(58) Field of Classification Search
CPC .... H04W 12/06; H04W 12/04; H04L 9/3247; H04L 63/0442; H04L 63/18
USPC ......................................................... 713/176
See application file for complete search history.

(56) References Cited

U.S. PATENT DOCUMENTS

| 9,003,519 | B2 | 4/2015 | Zeljkovic et al. |
| 9,166,799 | B2 | 10/2015 | Kim |
| 9,414,227 | B2 | 8/2016 | Palamara et al. |
| 2012/0297476 | A1 | 11/2012 | Zeljkovic et al. |
| 2015/0311934 | A1 | 10/2015 | Jang et al. |

(Continued)

OTHER PUBLICATIONS

"Digital Signature Standard (DDS)," Federal Information Processing Standards Publication, FIPS PUB 186-4, Jul. 2013, 130 pages.

(Continued)

*Primary Examiner* — Teshome Hailu
(74) *Attorney, Agent, or Firm* — Davis Wright Tremaine LLP

(57) ABSTRACT

A method and system for establishing two-way trust between a short-range communication device and a hub device. The method includes: obtaining, from a hub device, a digitally signed request for determining whether the hub device is a trusted communication device for a short-range communication device and a cryptographic key generated by the short-range communication device; generating a response to the request; encrypting the response to the request by using the cryptographic key provided by the short-range communication device, so that the encrypted response can be decrypted only by the short-range communication device; and providing the encrypted response to the hub device. The short-range communication device may decrypt the response and determine whether the hub device is the trusted communication device based on information indicated in the response.

20 Claims, 9 Drawing Sheets

(56) References Cited

U.S. PATENT DOCUMENTS

| | | | |
|---|---|---|---|
| 2016/0182459 A1* | 6/2016 | Britt | H04W 12/35 |
| | | | 713/171 |
| 2016/0188848 A1 | 6/2016 | Smith et al. | |
| 2016/0227403 A1 | 8/2016 | Narasimha et al. | |
| 2017/0055148 A1* | 2/2017 | Zimmerman | H04L 63/0428 |
| 2018/0091506 A1* | 3/2018 | Chow | H04L 67/567 |
| 2018/0227279 A1* | 8/2018 | Kim | H04W 12/069 |
| 2019/0020647 A1* | 1/2019 | Sinha | G06F 21/57 |
| 2019/0312945 A1* | 10/2019 | Cooppan | H04L 12/2809 |
| 2020/0213298 A1 | 7/2020 | Ericson | |

OTHER PUBLICATIONS

International Organization for Standardization/International Electrotechnical Commission, "Information Technology—Trusted Platform Module—Part 1: Overview," International Standard, ISO/IEC 11889-1(E), May 15, 2009, 20 pages.

International Organization for Standardization/International Electrotechnical Commission, "Information Technology—Trusted Platform Module—Part 2: Design principles," International Standard, ISO/IEC 11889-2(E), May 15, 2009, 152 pages.

International Organization for Standardization/International Electrotechnical Commission, "Information Technology—Trusted Platform Module—Part 3: Structures," International Standard, ISO/IEC 11889-3:2009(E), May 15, 2009, 204 pages.

International Organization for Standardization/International Electrotechnical Commission, "Information Technology—Trusted Platform Module—Part 4: Commands," International Standard, ISO/IEC 11889-4:2009(E), May 15, 2009, 254 pages.

Johnson, D. et al., "The Elliptic Curve Digital Signature Algorithm (ECDSA)," ANSI Standard, 1999, 56 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

\* cited by examiner

DYNAMIC ESTABLISHMENT OF TRUST BETWEEN LOCALLY CONNECTED DEVICES

CROSS REFERENCE TO RELATED APPLICATION

This application is a continuation of U.S. patent application Ser. No. 16/147,352, filed on Sep. 28, 2018, entitled "DYNAMIC ESTABLISHMENT OF TRUST BETWEEN LOCALLY CONNECTED DEVICES," the disclosure of which is hereby incorporated herein in its entirety.

BACKGROUND

The "Internet of Things" (hereinafter referred to as "IoT") includes one or more embedded devices communicating within the Internet infrastructure. These embedded devices (hereinafter referred herein as "short-range communication devices" or "IoT devices") communicate together to perform various functions such as collecting sensor data and modifying configurations of a device such as a thermostat. Accordingly, IoT results in new, wide-ranging types of applications in which virtually any type of physical object can be configured to provide information about itself or its surroundings and/or may be controlled remotely via client devices over the Internet. For example, the short-range communication devices, also interchangeably referred as nodes, may include physical objects lightbulbs, thermostats, and fans for a facility. To maintain portability and scalability, the short-range communication devices are designed to have limited functionalities and to connect to other devices using short range network channels such as Bluetooth Low Energy. In effect, the short-range communication devices are often unable to connect directly to the Internet.

Accordingly, the short-range communication devices frequently need to be connected to one or more hub devices that can connect to the Internet on behalf of the short-range communication devices and/or manage operations for the short-range communication devices. To establish a network connection between the short-range communication devices and the hub device and allow continuous communication between the two devices, the short-range communication devices need to determine whether the other device can be a trusted device although it is often the case in that these devices have no prior trust relationship or knowledge of each other. In particular, trust establishment between communicating parties is an aspect of securely communicating data between the parties and may include confirming or verifying that a communicating party has their purported identity. Further, trust establishment may ensure communicated data, which may include sensitive or secretive data, is received by an intended party. Accordingly, spoofing attacks, whereby an attacker may masquerade as a legitimate party to a communication and gain access to the sensitive or secretive data, may be minimized.

However, it is challenging to facilitate establishment of trust between these devices as they are manufactured by different entities, are largely unregistered for connection with other devices, and have no knowledge of each other. Currently, the trust establishment and the subsequent pairing of the devices are typically performed manually in which a customer or operator identifies the individual short-range communication devices that must be bound to each other at the time of installation and sends a message to a client device to establish trust with such short-range communication devices. This approach becomes difficult and inefficient in larger scale facilities or premises in which multiple short-range communication devices need to be securely connected to one or more hub devices.

BRIEF DESCRIPTION OF THE DRAWINGS

Various techniques will be described with reference to the drawings, in which.

DETAILED DESCRIPTION

Figure 1:
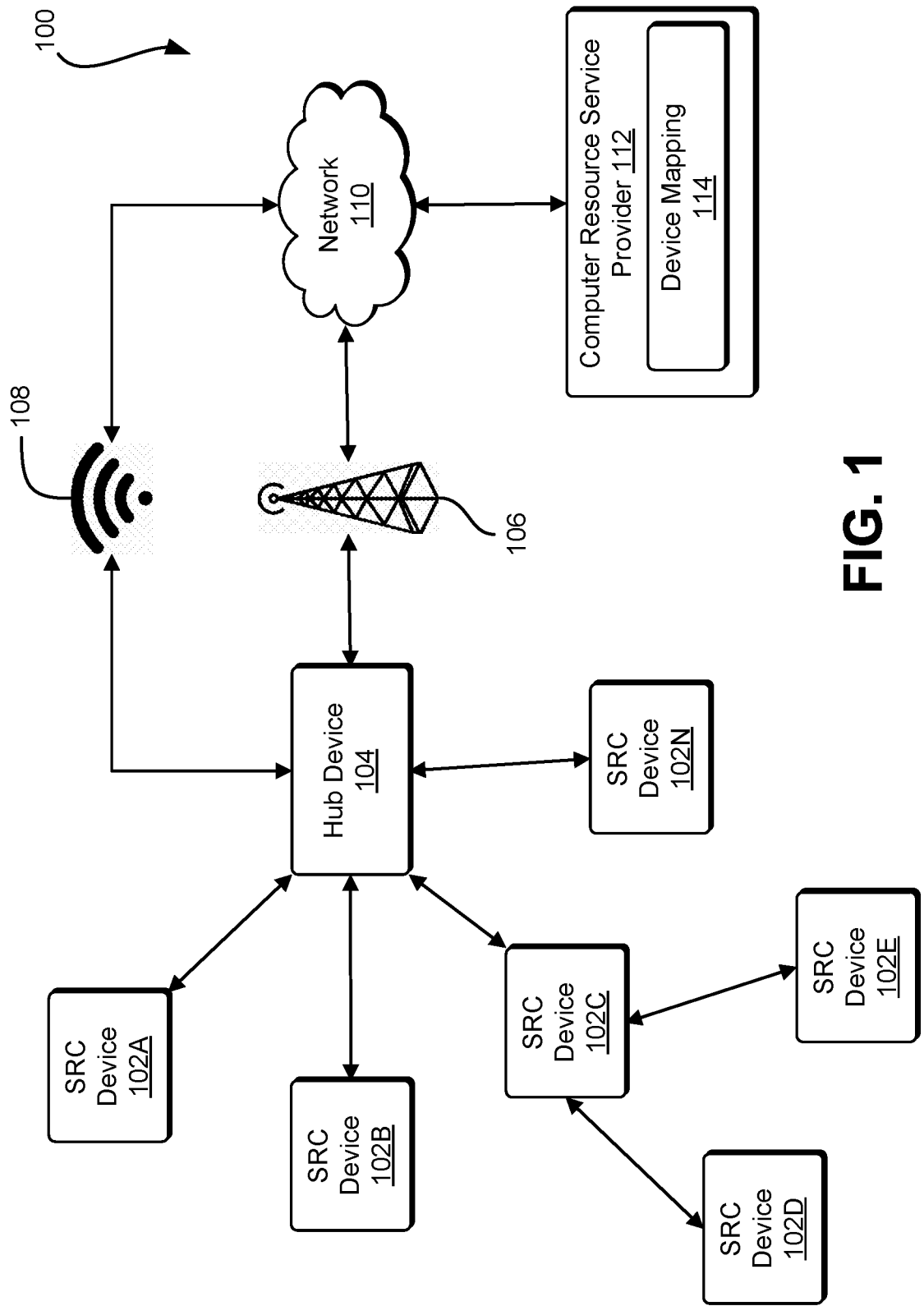
FIG. 1 illustrates an example diagram of a network environment in which a short-range communication device establishes trust with a hub device in accordance with an embodiment.

Techniques described and suggested herein include systems, methods, and processes for dynamically establishing trust between locally connected devices. In several aspects of the present disclosure, short-range communication devices dynamically establish trust with each other or with a plurality of hub devices without being directly connected to a network, in which the short-range communication devices communicate with a hub device to establish two-way trust relationships as authorized by a computer resource service provider, such as a manufacturing entity of a hub device and/or short-range communication device or a third party service provider that manages authentication of devices in an IoT environment. For the hub device to trust the short-range communication device, the short-range communication device presents its device identifier to the hub device, and the hub device communicates with the computer resource service provider whether the short-range communication device can be added into the hub device.

Conversely, the short-range communication device may establish its trust towards the hub device even without the short-range communication device having direct network connection the computer resource service provider. In one example, the short-range communication device transmits, through a short range communication channel, a request to the hub device which then forwards such request to the computer resource service provider. Afterwards, the computing resource service provider generates a response and provides the response back to the hub device which then returns the response back to the short-range communication device. Based on the response, the short-range communication device may determine that the hub device is a trusted communication device. The two-way trust relationship has been established, and the short-range communication device and the hub device can thus connect with each other. For example, a Bluetooth Low Energy door lock can automatically establish a two-way trust with a home automation device so that the home automation device can manipulate the door lock to be locked or unlocked. In another example, a facility sensor device may automatically establish trust with a controller device before performing operations that can be coordinated by the controller device. As presented in above examples, the secure and efficient approach to connect the short-range communication devices improves the field of network technology in which a large number of short-range communication devices needs to be connected to a network.

In several aspects of the present disclosure, the trust relationships between devices can be pre-configured and stored by the computer resource service provider at any time prior to installing the short-range communication devices and the hub devices. Once the hub device broadcasts its availability to accept local connection, short-range communication devices can dynamically communicate, with the hub device serving as a proxy, with the computer resource service provider which determines whether the other short-range communication device and the hub device can be considered as trusted communication device(s) to each other. Based on the requests, the computer resource service provider transmits a response to the short-range communication device and/or hub device indicating whether trust relationships can be formed with other short-range communication devices and the hub device.

To protect the communication exchanged between the short-range communication device and the computer resource service provider, the aspects of the present disclosure ensure that the hub device serving as a proxy (which can be an untrusted gateway) cannot tamper with messages, such as requests and responses, exchanged by the short-range communication device. For instances, aspects of the present disclosure causes messages intended to be exchanged between short-range communication device and the computer resource service provider to be cryptographically protected by means of encryption and digital signatures so that the trust can be established between the hub device and the short-range communication device without giving the hub device an ability to tamper, spoof, or otherwise access contents of the response generated by the computer resource service provider. This allows the device to establish trust with the hub device while reducing risks of messages generated by short-range communication devices (e.g., requests, responses) being compromised by other entities. In other aspects of the present disclosure, once the two-way trust has been established, the hub device can additionally be used to establish trust between multiple short-range communication devices by configuring the hub device to be a gateway for these short-range communication devices.

As one skilled in the art will appreciate in light of this disclosure, certain embodiments may be capable of achieving certain advantages, including improved efficiency of establishing connection among the short-range communication devices since the process is performed automatically and does not require manual intervention. Embodiments of the present disclosure may be implemented across devices that are from different ecosystems and seamlessly connect them, which improves the existing field of IoT technology which struggle with connecting IoT devices that are not pre-configured to be compatible from each other. Furthermore, embodiments of the present disclosure may enable the short-range communication device to establish trust with the hub device in a tamper-proof manner which protects the IoT devices from any unauthorized access. Further, there is a challenge in existing IoT infrastructures, which typically include hub devices that are not trusted by short-range communication devices at the outset. Such untrusted hub devices, however, are needed to be used as proxy devices that forward information transmitted from a short-range communication device to a computing resource service provider, which evaluates whether the hub devices in question can be trusted. Accordingly, the embodiments of the present disclosure address this challenge of existing IoT infrastructures by cryptographically protecting the information forwarded by the hub devices to a computer resource service provider. In this manner, malicious hub devices can thus be prevented from accessing the information from the short-range communication devices, establishing unauthorized trust, and attacking the short-range communication devices.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example diagram of a network environment 100 in which short-range communication devices 102A-102N establish trust with a hub device 104 in accordance with an embodiment. In particular, the illustrated embodiment includes a plurality of short-range communication devices 102A-102N communicatively coupled over local communication channels to a hub device 104 which is itself communicatively coupled to a computer resource service provider 112 over the network 110. Each of the short-range communication devices 102A-102N may be provisioned to be locally connected to the hub device 104, and, once the trust relationship is established between the short-range communication device and the hub device data can be exchanged as well as operations of the short-range communication device can be managed by the hub device 104 through the local communication channels.

The short-range communication devices 102A-102N may be equipped with various types of sensors to collect information about themselves and their surroundings and provide the collected information to the hub device 104, which may then relay the collected information to the computer resource service provider 112. Some of the short-range communication devices 102A-102N may perform a specified function in response to control commands sent through the hub device 104. Various specific examples of information collected by the short-range communication devices 102A-102N may include audio and images captured by the camera sensors attached to the short-range communication devices 102A-102N, in which the hub device 104 controls several aspects of capture operations including the time in which audio needs to be captured. In one embodiment, the short-range communication device may also be a user input device designed to record user selections and send the user selections to the hub device 104 and/or the computer resource service provider 112. In another embodiment, the short-range communication device may be a wearable device comprising one or more sensors that collect data of its surroundings which can be provided to the hub device 104.

In one embodiment, the hub device 104 includes a cellular radio to establish a connection to the network 110 via a cellular service 106 such as a 4G (e.g., Mobile WiMAX, LTE) or 5G cellular data service. Alternatively, or in addition, the hub device 104 may include a WiFi radio to establish a WiFi connection 108 through a WiFi access point or router which couples the hub device 104 to the network 110 (e.g., an Internet service provided by an internet service provider to the end user). In several embodiments, it should be noted that the underlying principles of the disclosure are not limited to any particular type of communication channel or protocol.

In one embodiment, the short-range communication devices 102A-102N include ultra low-power devices capable of operating for extended periods of time on battery power (e.g., years). To conserve power, the local communication channels may be implemented using a low-power wireless communication technology such as Bluetooth Low Energy (LE). In this embodiment, each of the short-range communication devices 102A-102N and the hub device 104 are equipped with Bluetooth LE radios and protocol stacks. Additionally, the short-range communication devices 102A-102N may establish short-range communication channel with the hub device 104 using various technologies, such as induction wireless, infrared wireless (such as technologies operating according to specifications and protocols provided by the Infrared Data Association, or IrDA), Z-wave, Zigbee, RuBee, IrDA, Thread, Bluetooth, Insteon, 6LoWPAN, Highway Addressable Remote Transducer Protocol (HART), supervisory control and data acquisition (SCADA) systems, industrial fieldbus protocols used for real-time distributed control of industrial systems (such as those standardized under IEC 61158), Near Field Communication (NFC), 802.15.4 protocols, or ultra wideband formats.

In some embodiments, the short-range communication devices 102A-102N may utilize short-range, low-power and high-frequency radio transmissions. In still other embodiments, the short-range communication devices 102A-102N may support acoustic-based data transfer. For example, a hub device 104 may include software components and a speaker that enable the hub device 104 to broadcast data to one or more short-range communication devices 102A-102N as sound waves, while the short-range communication device may include software components and microphone that enable the hub device 104 to receive the data embedded in the sound waves. Thus, short-range communication device may use one or more of radio signal-based data transfer (e.g., near field communication (NFC) or Bluetooth), light-based data transfer (e.g., infrared data transfer), an acoustic-based data transfer (e.g., sound wave-embedded data), or magnetic field-based transfer (e.g., reading data from a magnetic stripe) for inter-device communication. The protocols and components for enabling computing devices to perform the systems and methods of the present disclosure using such means for inter-device communication are well known to those skilled in the art of computer communications and thus, need not be described in more detail herein. Generally, embodiments described herein are not limited to those explicitly illustrated herein.

In one embodiment, the hub device 104 may be a user device that allows users to access and configure the connected short-range communication devices 102A-102N and/or interact with computer resource service provider 112. In several embodiments, the hub device 104 may be a client device such as tablet computing devices, voice-controlled devices, televisions, set-top boxes, smart watches, mobile telephones, laptop computers, or the like. In these embodiments, the hub device 104 may include a client application that manages one or more operations of the short-range communication devices 102A-102N. In other embodiments, the hub device 104 may be a network router in which the hub device 104 simply forwards data collected by short-range communication devices 102A-102N to the computer resource service provider 112.

Figure 9:
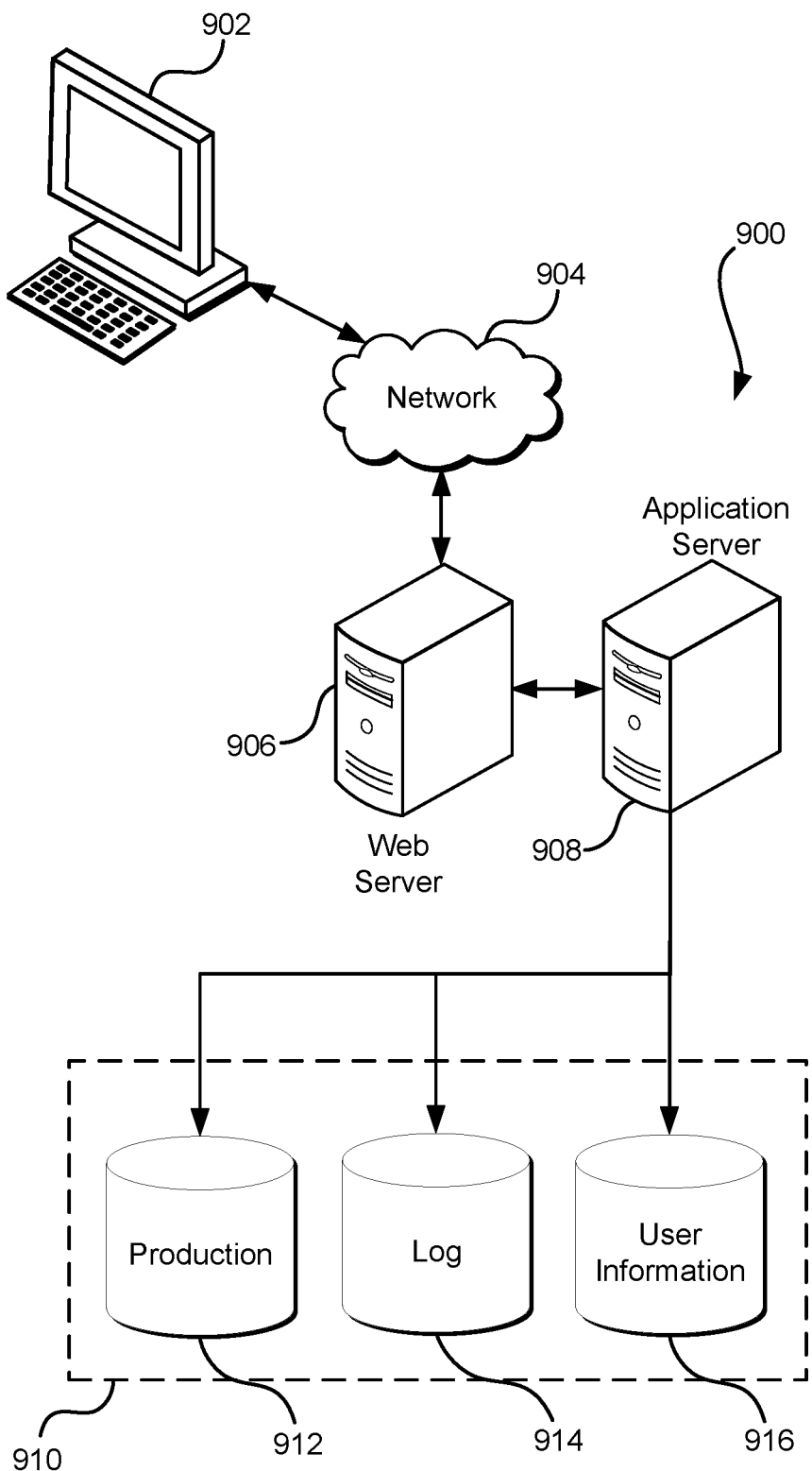
FIG. 9 illustrates a system in which various embodiments can be implemented.

In one embodiment, the hub device 104 may interact with an application server (e.g., application server 908 of FIG. 9) of the computer resource service provider 112 through the network 110 that provides one or more services, including content services that provide text, graphics, audio, video and/or other content in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. As illustrated in FIG. 9, the short-range communication device and/or the hub device 104 may access one or more application servers through a web server (e.g., web server 906 of FIG. 9) which receives requests from the short-range communication device and/or the hub device 104 and provides the response generated by the application server. Further, the computer resource service provider 112 may include IoT service and device mapping 114 which can be stored and retrieved from a data store (e.g., data store 910 of FIG. 9) and provided back to the requestor.

In an alternative embodiment, additional connection options may be available for one or more hub devices, including hub device 104. In this embodiment a single user may be associated with multiple hub devices (including hub device) installed onsite at a single premises (e.g., a manufacturing facility). The hub devices can be positioned within the premises to extend the wireless range needed to connect all of the short-range communication devices 102A-102N. In one embodiment, each of the hub devices may establish a direct connection to the computer resource service provider 112 through a cellular service 106 or WiFi connection 108 to establish trust relationship with the short-range communication devices 102A-102N. In another embodiment, one of the hub devices may act as a "primary" hub which provides connectivity and/or local services to all of the other hub devices on the premises. For example, the primary hub device (e.g., hub device 104) may be the only hub device to establish a direct connection to the computer resource service provider 112. In one embodiment, only the "primary" hub device is equipped with a cellular communication interface to establish the connection to the computer resource service provider 112. As such, all communication between the computer resource service provider 112 and the other hub devices will flow through the primary hub device. In this role, the primary hub device may be provided with additional program code to perform filtering operations on the data exchanged between the other hub devices and computer resource service provider 112.

In this embodiment, regardless of how the hub devices are connected with the short-range communication devices 102A-102N, the computer resource service provider 112 will logically associate the hubs with a single premise and combine all of the attached short-range communication devices 102A-102N under a single comprehensive user interface, accessible via a user device with a client application and/or a browser-based interface. In several embodiments, a virtually unlimited number of such hub devices may be installed and configured to collect data from short-range communication devices 102A-102N at user premises around the world. In one embodiment, the two or more premises may be configured for the same user. For example, one user premises may be the user's primary home, and the other user premise may be a manufacturing facility operated by the user. In such a case, the computer resource service provider 112 will logically associate the hub devices with the user and manage the corresponding short-range communication devices 102A-102N of the premises under a single comprehensive user interface, accessible via a user device with a client application and/or a browser-based interface.

In an alternate embodiment, one or more short-range communication devices (e.g., short-range communication devices 102D and 102E) may be connected to another short-range communication device (e.g., short-range communication device 102C) through short-range communication channel, in which the other short-range communication channel may establish connection with the hub device on behalf of the short-range communication devices connected therewith. For example, the short-range communication device 102D may be connected with short-range communication device 102C. The short-range communication device 102D may generate a request whether the hub device 104 may be trusted, then the request may flow through the short-range communication device 102C and the hub device 104 to reach the computer resource service provider 112. In other embodiments, one or more short-range communication device may be enabled to communicate directly with the computer resource service provider 112 through the network 110. In these embodiments, such short-range communication device may serve as the hub device for other short-range communication devices.

Computer resource service provider 112 stores a list of devices and corresponding hub devices in which the devices can be listed as trusted devices for the hub devices and vice versa. In particular, computer resource service provider 112 may include device mapping 114, which provides information as to whether a short-range communication device (e.g., short-range communication device 102A) can be a trusted device for the hub device 104, and vice versa. Computer resource service provider 112 may store device mapping in a data store, such as data store 910 of FIG. 9. In one embodiment, the short-range communication device is mapped as a trusted device of the hub device 104 based on the short-range communication device being registered together with the hub device 104 in the computer resource service provider 112. In another embodiment, the short-range communication device and the hub devices can be mapped together based on the manufacturing entity of the short-range communication device and/or the hub device 104. Any time during the connection between the short-range communication device and the hub device 104, a device mapping 114 can be updated to add, modify, or remove the list of trust relationships between the hub devices and the short-range communication devices 102A-102N.

By accessing the device mapping of the computer resource service provider 112, the short-range communication devices 102A-102N and the hub device 104 may determine whether trust can be established with each other. In several embodiments, the response transmitted by the computer resource service provider 112 is cryptographically protected including a response generated based on a request submitted by the short-range communication devices 102A-102N and forwarded by hub device 104. In this manner, the cryptographically protected response may prevent the hub device 104 from tampering or otherwise accessing the content in the response that is intended for the short-range communication device.

Figure 2:
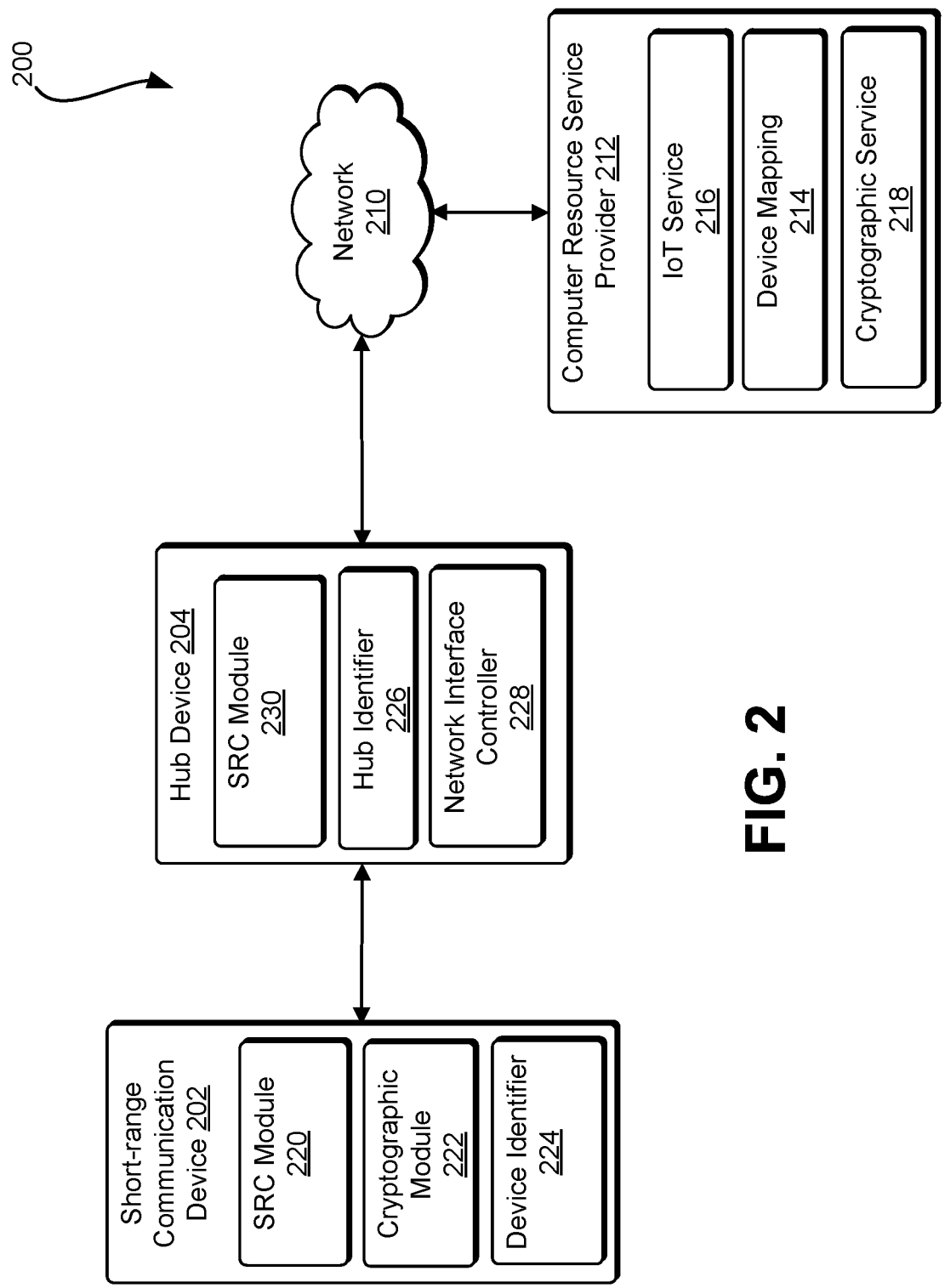
FIG. 2 illustrates an example diagram of a network environment in which a short-range communication device establishes trust with a hub device based on the hub device serving as proxy in accordance with an embodiment.

FIG. 2 illustrates an example diagram of a network environment 200 in which a short-range communication device establishes trust with a hub device based on a hub device serving as proxy in accordance with an embodiment. Network environment 200 includes short-range communication device 202, hub device 204, network 210, and computer resource service provider 212. Short-range communication device 202 includes short-range communication module 220, cryptographic module 222, and device identifier 224. Hub device 204 includes network interface controller 228, SHORT RANGE COMMUNICATION module 230, and hub identifier 226. Computer resource service provider 212 may include IoT service 216, device mapping 214, and cryptographic service 218.

In one embodiment, short-range communication device 202 includes a short-range communication module 220. Short-range communication module 220 may achieve communications between the short-range communication device 202 and a hub device 204 via a wireless network. The short-range communication module 220 may comprise at least one module selected from: Wi-Fi wireless modules, WiMAX modules, WAPI modules, Bluetooth modules, near-field communication (NFC) modules, infrared modules, ultrasonic modules, Wireless USB modules, RFID modules, etc. The short-range communication module 220 may be a Bluetooth module, supporting Bluetooth 4.0 or lower version of communication protocols. Short-range communication module 220 may comprise a receiver and a transmitter to receive and transmit the wireless signals from the hub device 204. The short-range communication module 220 can also be designed to match the communication module of mobile hub device 204. Short-range communication module 220 may also periodically communicate with the mobile hub device 204, that is, may receive regular heartbeat signals from the mobile hub device 204 to monitor the condition of the mobile hub device 204, for example, whether there are new calls, short messages, etc. As illustrated above in FIG. 1, short-range communication module 220 may activate short range communication channels for the short-range communication device 202, in order to allow short-range communication device 202 to establish connection with the hub device 204.

In several embodiments, short-range communication device 202 and computer resource service provider 212 respectively includes cryptographic module 222 and cryptographic service 218 which may be a set of software and/or hardware components used to perform cryptographic operations to ensure that any requests directed to the computer resource service provider 212 and responses thereto are not tampered or otherwise accessed by the hub device 204 or any other intermediate devices. The cryptographic module 222 or cryptographic service 218, which may be a trusted platform module (TPM), may include a memory subsystem, including a main random access memory (RAM) for storage of instructions and data during program execution and a read only memory (ROM), in which fixed cryptographic information may be stored, such as a hardware secret stored securely within the device of the computer resource service provider 212 so as to be non-exportable (i.e., inaccessible through any call to the cryptographic module). The cryptographic module 222 or cryptographic service 218, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. Cryptographic keys may be stored in RAM and/or processor registers for temporary cryptographic processing. Cryptographic module 222 or cryptographic service 218 may use the cryptographic information stored in memory in combination with cryptographic information obtained from one or more devices by connecting through the network 210. Cryptographic module 222 or cryptographic service 218 may include one or more cryptographic processors which may be used by cryptographic module 222 or cryptographic service 218 to perform cryptographic operations for the computer resource service provider 212 and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one-way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure. Generally, one or more components of the cryptographic module 222 or cryptographic service 218 may collectively perform various operations used to generate cryptographically verifiable information for requests generated by short-range communication device 202 and/or response transmitted by the computer resource service provider 212, to ensure that the process of establishing two-way trust cannot be tampered with other intermediate devices (e.g., hub device 204).

As noted above, in various embodiments of the present disclosure, hardware secrets are securely stored within the cryptographic module 222 or cryptographic service 218. In some embodiments, the cryptographic module 222 or cryptographic service 218 is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs may include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

In several embodiments, cryptographic module 222 or cryptographic service 218 may digitally sign the messages generated by the short-range communication device 202 and/or the computer resource service provider 212. As referred herein, digital signature includes any information usable to cryptographically verify authenticity of a message, e.g., response generated based on request forwarded by the hub device 204, including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted by cryptographic module 222 or cryptographic service 218 so as to be decryptable by the system that will cryptographically verify the data object, where the ability to decrypt the data object serves as cryptographic verification of the data object. As another example, the data object may be digitally signed (thereby producing a digital signature of the data object) by cryptographic module 222 or cryptographic service 218 such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable.

In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object.

Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In one embodiment, short-range communication device 202 includes a device identifier 224, which may be a combination of alphanumeric characters that uniquely define the short-range communication device 202. The device identifier 224 allows the computer resource service provider 212 to identify the short-range communication device 202 and any devices that can qualify as trusted communication devices. In some embodiments, the device identifier 224 may be serial number of the short-range communication device 202. In other embodiments, the device identifier 224 may include, in addition to the serial number, user account information that activated the short-range communication device 202. Similarly, hub device 204 may include a hub identifier 226, which may also be a combination of alphanumeric characters that uniquely define the hub device 204. As noted above, the hub identifier 226 may be serial number of the hub device 204. In other embodiments, the device identifier 224 may include, in addition to the serial number, user account information of the hub device 204. In yet other embodiments, the hub identifier 226 can be a telephone number if the hub device 204 is configured to communicate to the network 210 via cell communication channels. In addition, the hub device 204 may include the short-range communication module 230, which performs similar operations as the short-range communication module 220 of the short-range communication module 220 and enables the hub device 204 to communicate with the short-range communication device 202.

In some embodiments, the device identifier 224 may be cryptographically strong identifiers that can be verified by the hub device 204, which prevents such identifiers from being spoofed by other unauthorized short-range communication devices through using fake or stolen device identifiers. For example, the device identifier 224 may be a certificate respectively issued for short-range communication device 202. In this example, the hub device 204 may verify the device identifier 224 by: (1) determining whether short-range communication device 202 actually owns the device identifier 224 (e.g., certification) by using proof of possession operations with a challenge/response mechanism; and (2) determining whether the device identifier 224 for short-range communication device 202 is valid by checking whether the certificate associated with the device identifier 224 is signed, not expired, not blocklisted, etc. In other embodiments, the hub identifier 226 may also be cryptographically strong identifiers in which both the device identifier 224 and the hub identifier 226 can be cryptographically verified by the computer resource service provider 212.

Hub device 204 may further include communication interface. Communication interface of the hub device 204 may include a network interface controller 228 (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. As an example and not by way of limitation, the hub device 204 may communicate with an ad hoc network, a PAN, a LAN, a WAN, a MAN, or one or more portions of the Internet or a combination of two or more of these. One or more portions of one or more of these networks may be wired or wireless. As an example, the hub device 204, using the communication interface, may communicate with a computer resource service provider 212 or one or more short-range communication devices 202 using wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. The hub device 204 may include any suitable communication interface for any of these networks, where appropriate. Communication interface may include one or more communication interfaces, where appropriate. Although this disclosure describes and illustrates a particular communication interface, this disclosure contemplates any suitable communication interface.

In one embodiment, computer resource service provider 212 includes IoT service 216. IoT service 216 provides one or more services to a short-range communication device 202 via one or more APIs. The one or more services can include, but are not limited to, an administrative service, a data metering service (a data service that can take one or more data feeds from short-range communication device 202 and perform operations on the data including, but not limited to, modifying, averaging, aggregating, transforming, etc.), a crawler service, a messaging service, a DNS service, and the like. In some embodiments, IoT service 216 may store data provided by the short-range communication device 202 to allow the hub device 204 to perform one or more operations on the data stored by the IoT service 216. In several embodiments, the short-range communication device 202 and/or the hub device 204 may use the IoT service 216 provided by the computer resource service provider 212 if both devices establish the two-way trust relationship.

Figure 3:
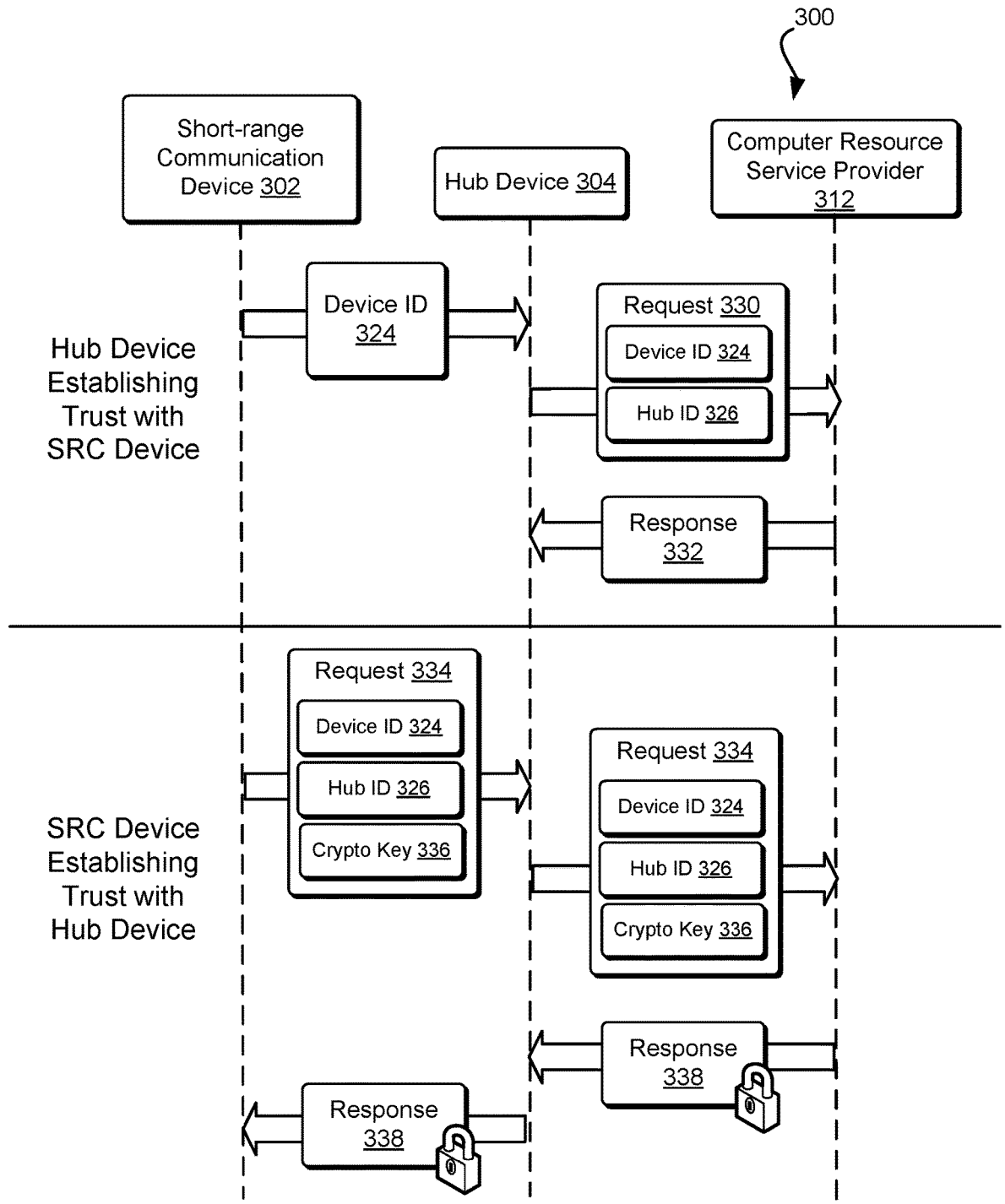
FIG. 3 illustrates an example sequence diagram in which a short-range communication device establishes trust with a hub device in accordance with an embodiment.

FIG. 3 illustrates an example sequence diagram 300 in which a short-range communication device establishes trust with a hub device in accordance with an embodiment. short-range communication device 302 may be short-range communication device 202 discussed above in connection with FIG. 2. Hub device 304 may be the hub device 204 discussed above in connection with FIG. 2. Computer resource service provider 312 may be computer resource service provider 212 discussed above in connection with FIG. 2.

The sequence 300 in which a short-range communication device 302 establishes trust with a hub device 304 is initiated with the hub device 304 obtaining device identifier 324 (e.g., device identifier 224 of FIG. 2) from the short-range communication device 302. In one embodiment, the sequence of establishing trust may be a synchronous operation in which the request 330 is transmitted as a result of the short-range communication device 302 attempting to establish connection with the hub device 304. In other embodiments, the sequence of establishing trust may be an asynchronous operation in which the hub device 304 may generate a batch file of requests submitted by one or more short-range communication devices and provides the batch file to the computer resource service provider 312 at later time. In several embodiments, the hub device 304 obtains the device identifier 324 of the short-range communication device 302 by using a short range communication channel established between wireless module of the short-range communication device 302 (e.g., wireless module of FIG. 2) and the network interface controller of the hub device 304 (e.g., network interface controller of FIG. 2). In one embodiment, the hub device 304 determines the device identifier 324 of the short-range communication device 302 by broadcasting the hub device 304's availability to accept connections and retrieving the device identifier 324 when it shows as one of the available devices for connection during the broadcast.

After obtaining the device identifier 324 of the short-range communication device 302, the hub device 304 may submit the device identifier 324 and the hub identifier 326 (e.g., hub identifier 226 of FIG. 2) to the computer resource service provider 312. In one embodiment, the hub device 304 may submit the device identifier 324 and the hub identifier 326 through a cellular service (e.g., cellular service 106 of FIG. 1) or a WiFi service (e.g., WiFi connection 108 of FIG. 1). The computer resource service provider 312 may determine whether the short-range communication device 302 can be trusted by the hub device 304. Based on such determination, the computer resource service provider 312 may transmit a response 332 to the hub device 304. If the short-range communication device 302 has been indicated as a trusted device based on the response 332, the hub device 304 may accept connection from the short-range communication device 302. If the short-range communication device 302 has not been indicated as a trusted device based on the response 332, the hub device 304 may block the short-range communication device 302 from establishing connection with the hub device 304. Accordingly, the first part of the two-way trust establishment has been accomplished.

The short-range communication device 302 may continue the two-way trust establishment process by submitting a request 334 to the hub device 304. As illustrated above, the short-range communication device 302 may not be able to establish direct network connection with the computer resource service provider 312, and consequently short-range communication device 302 requires the hub device 304 to act as its proxy. The request 334 provided by the short-range communication device 302 may indicate whether the short-range communication device 302 is authorized to establish a network connection with the hub device 304. In one embodiment, the request 334 may additionally include a cryptographic key 336 that was generated by cryptographic module of the short-range communication device 302 (e.g., cryptographic module 222 of FIG. 2), in which the public cryptographic key 336 can be used by the computer resource service provider 312 to encrypt the content of the response 338 that was generated by the computer resource service provider 312. In another embodiment, the request 334 may be digitally signed by the short-range communication device 302 to ensure that the request 334 can be authenticated by the computer resource service provider 312.

In some embodiments, the request 334 may be encrypted by the short-range communication device 302 to prevent other devices from accessing the information within the request. In one embodiment, the short-range communication device 302 may encrypt the request 334 (which in turn includes another public cryptographic key 336) using a pre-installed cryptographic key that is shared between the short-range communication device 302 and the computer resource provider 312. In another embodiment, the short-range communication device 302 may encrypt the request 334 with a pre-installed public cryptographic key provided by a certificate authority for the computer resource service provider 312. Because the request 334 is encrypted with a pre-installed cryptographic key, other devices will be unable to perform malicious operations (e.g., replay attack, spoofing attack) using the request 334 such as delaying the request 334 from transmitting or storing the request for later replay attack. At any rate, encrypting the request 334 prevents its information from being obtained by devices and/or entities other than the computer resource service provider 312.

Once the request 334 is received by the hub device 304, the hub device 304 forwards the request 334 to the computer resource service provider 312. Similar to the hub device 304 trust establishment process, the computer resource service provider 312 determines whether the hub device 304 can be considered as a trusted communication device for the short-range communication device 302. Regardless of the outcome of such determination, the computer resource service provider 312 may generate a response 338 to be transmitted to the short-range communication device 302. In one embodiment, the computer resource service provider 312 encrypts the response 338 with the cryptographic key 336 of the short-range communication device 302 to prevent the hub device 304 from accessing the content in the response 338. In some embodiments, the encrypted response 338 may also include digital signature of the computer resource service provider 312 to ensure that the response 338 can be authenticated as being originated from the computer resource service provider 312.

Thereafter, the hub device 304 may forward the encrypted response 338 to the short-range communication device 302. The short-range communication device 302 may then decrypt the response 338 by using its private cryptographic key 336 and parse the content of the response 338. If the response 338 indicates that the hub device 304 is indeed a trusted communication device, then the short-range communication device 302 may indicate to the hub device 304 that the second part of the two-way trust establishment has been accomplished. In the event that the two-way trust establishment process is successful, the short-range communication device 302 may be connected to the hub device 304 and allow the hub device 304 to manage one or more operation of the connected short-range communication device 302.

Figure 4:
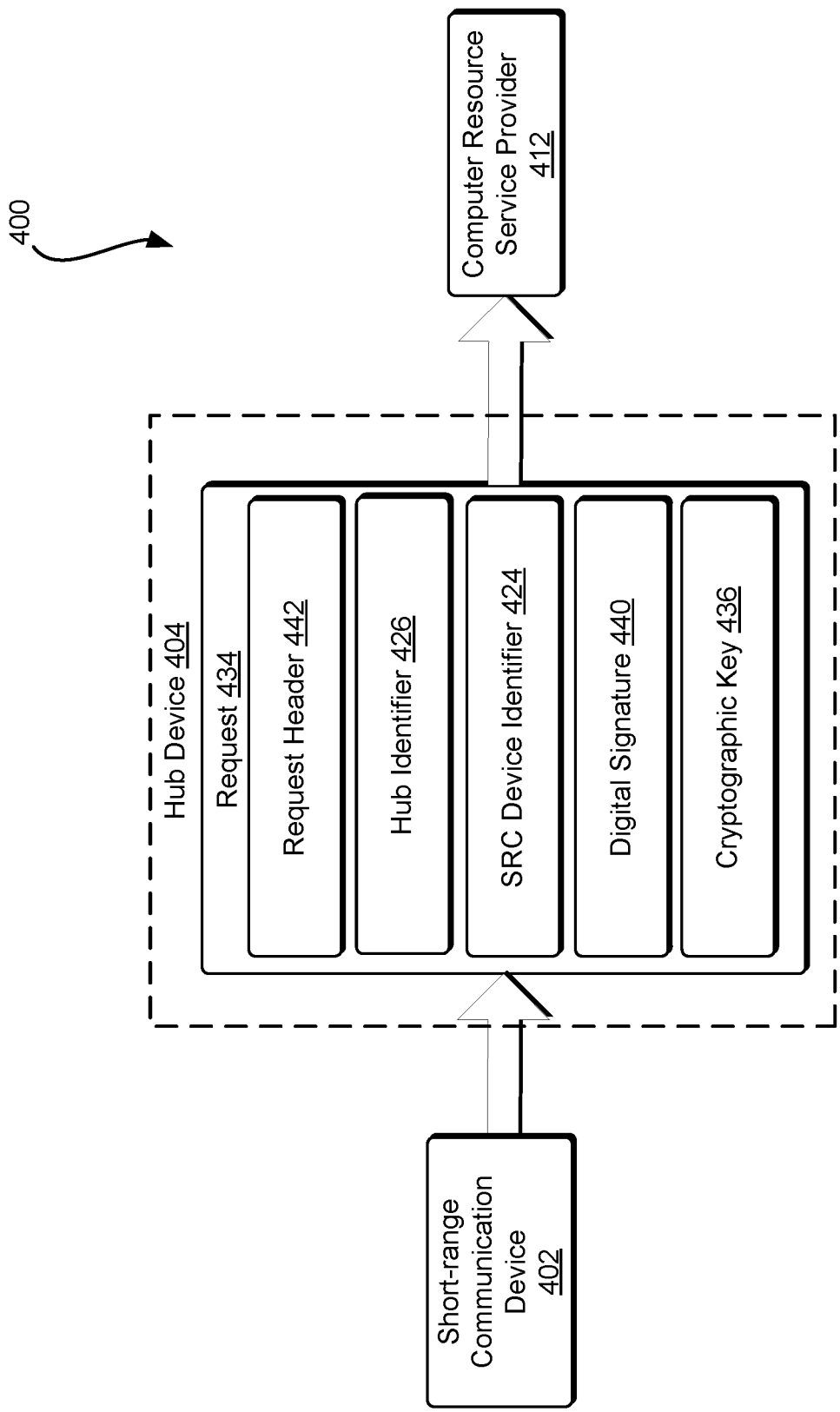
FIG. 4 illustrates an example diagram of a request generated by a short-range communication device in accordance with an embodiment.

FIG. 4 illustrates an example diagram 400 of a request generated by a short-range communication device in accordance with an embodiment. Hub device 404 may be hub device 204 discussed above in connection with FIG. 2. Request 434 may be request 330 discussed above in connection with FIG. 3. Hub identifier 426 may be hub identifier 326 discussed above in connection with FIG. 3. Short-range communication device identifier 424 may be device identifier 324 discussed above in connection with FIG. 3.

In several embodiments, hub device serves as a proxy for the short-range communication device 402 (e.g., short-range communication device 202 of FIG. 2) to establish a connection with the computer resource service provider 412 and exchange data with the service provider. The request includes request header 442, hub identifier 426, short-range communication device identifier 424, digital signature 440, and cryptographic key 436. In one embodiment, the request header 442 may include alphanumeric characters that identify the source of the request (e.g., short-range communication device 402) and other values that identify the destination of the request (e.g., computer resource service provider 412). In some embodiments, the request header 442 may include headers that include source IP address, destination IP address, source port, destination port, and protocol ID of the networking protocol in use. In some embodiments, the values in the request header 442 may be used as input for a hash function, for example, and the output of the hash function may be used to select the next hop or link for the packet. By providing the destination information in the request header 442, the hub device may act as a hop or link that routes the request from the short-range communication device 402 to computer resource service provider 412. In other embodiments, request header 442 may include a request identifier to allow the computer resource service provider 412 to identify the request and a timestamp indicating when the request 434 was generated by the short-range communication device 402.

In one embodiment, the request may be digitally signed by the short-range communication device by using digital signature 440. As illustrated above, digital signature 440 may include a signature component and a uniqueness constrained value. In some embodiments, the signature component and uniqueness constrained value collectively form a digital signature 440 generated using the ECDSA, such as discussed in the Federal Information Processing Standards Publication (FIPS) 186-4 and in ANSI X9.62, Public Key Cryptography for the Financial Services Industry: The Elliptic Curve Digital signature 440 Algorithm (ECDSA), 1999, which are incorporated herein by reference. For instance, the signature component and uniqueness constrained value collectively form a digital signature 440 for the digital signature algorithm (DSA), also discussed in FIPS 186-4, and other variations of the ElGamal Signature Scheme.

The request may further include a cryptographic key 436 provided by the short-range communication device 402. In some embodiments, the cryptographic key 436 may be a public cryptographic key of the short-range communication device 402 provided to the computer resource service provider 412 to encrypt the response as a result of receiving the request forwarded by the hub device. In other embodiments, the cryptographic key 436 may be a symmetric cryptographic key which can additionally be encrypted with a public key provided by the computer resource service provider 412. In these embodiments, the encrypted symmetric key may be decrypted by the computer resource service provider 412 using the private key, then uses the symmetric key to encrypt the response corresponding to the request submitted by the short-range communication device 402. Although this disclosure describes and illustrates a number of approaches to cryptographically protect the request, this disclosure contemplates any suitable methods as recognized by one ordinarily skilled in the art.

Figure 5:
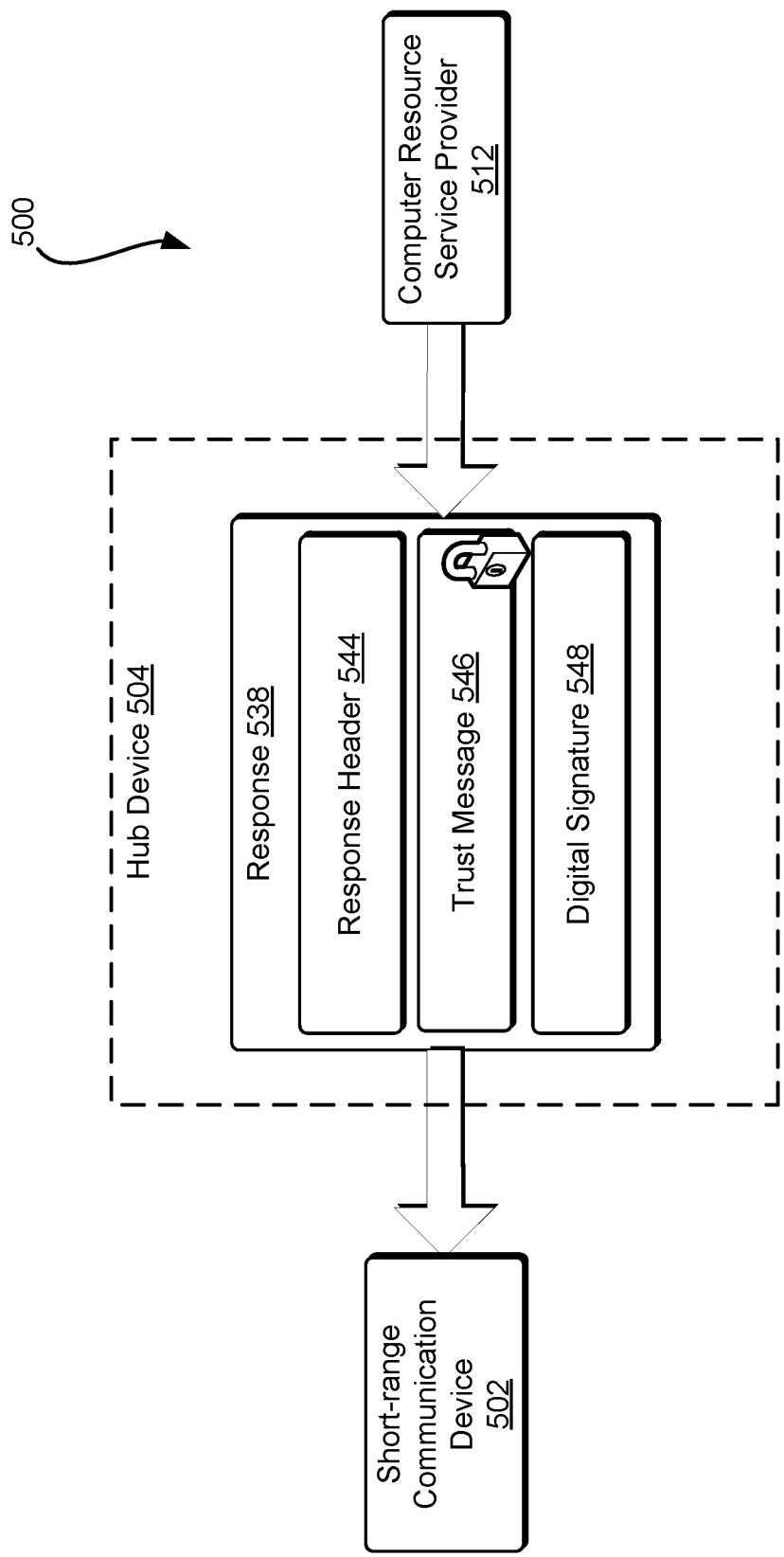
FIG. 5 illustrates an example diagram of a response generated by a computer resource service provider as a result of processing the request from a short-range communication device in accordance with an embodiment.

FIG. 5 illustrates an example diagram 500 of a response generated by a computer resource service provider as a result of processing the request from a short-range communication device in accordance with an embodiment. Hub device 504 may be hub device 204 discussed above in connection with FIG. 2. Response 538 may be response 338 discussed above in connection with FIG. 3.

In several embodiments, hub device 504 serves as a proxy for the computer resource service provider 512 to provide the response 538 corresponding to the request submitted by the short-range communication device 502. The response 538 may include response header 544, trust message 546, and digital signature 548. In one embodiment, the response header 544 may include alphanumeric characters that identify the source of the response 538 (e.g., computer resource service provider 512) and other values that identify the destination of the response 538 (e.g., short-range communication device 502). In some embodiments, the response header 544 may include headers that include source IP address, destination IP address, source port, destination port, and protocol ID of the networking protocol in use. Similar to the request header 442 of FIG. 4, the values in the response header 544 may be used as input for a hash function, for example, and the output of the hash function may be response 538 to select the next hop or link for the packet. By providing the destination information in the request header, the hub device 504 may act as a hop or link that routes the response 538 from the computer resource service provider 512 to the short-range communication device 502.

The response 538 also includes a trust message 546. In several embodiments, trust message 546 is a message generated by the computer resource service provider 512 indicating that the short-range communication device 502 and the hub device 504 can trust each other. If the trust message 546 is processed by the short-range communication device 502, the short-range communication device 502 may allow the hub device 504 to perform one or more computing operations for the short-range communication device 502, manage operations performed by the short-range communication device 502, and/or obtain data collected via one or more sensors of the short-range communication device 502. In several embodiments, the hub device 504 may perform one or more of the above operations through the short range communication channel (e.g., Bluetooth LE) established between the hub device 504 and the short-range communication device 502. In other embodiments, the short-range communication device 502 may use the trust message 546 provided by the computer resource service provider 512 to establish trust relationship with one or more additional hub devices (e.g., secondary hub device) associated with the hub device 504. In these embodiments, the other hub devices may be synchronized with the hub device 504 to ensure that proper connection is established between the other hub devices and the short-range communication device 502. In yet other embodiments, the short-range communication device 502 may use the trust message 546 provided by the computer resource service provider 512 to establish trust relationship with one or more additional short-range communication devices already connected and trusted by the hub device 504. By providing a single trust message 546 to allow a plurality of short-range communication devices connect to the hub device 504 to trust and communicate with each other, the time spent to provision the short-range communication devices may be significantly decreased.

In one embodiment, the trust message 546 may provide information regarding whether the hub device 504 is a trusted communication device for the short-range communication device 502. In other embodiments, the trust message 546 may include additional information such as additional hub devices or other short-range communication devices to which the short-range communication device 502 may establish trust. In some embodiments, the trust message 546 may further include a set of conditions that restricts the operation of the short-range communication devices through the hub device 504. For example, the trust message 546 may indicate that the short-range communication device 502 only provide sensor data to the hub device 504, and prohibit the device from connecting directly to the Internet using the connection established between the short-range communication device 502 and the hub device 504. In another embodiment, the trust message 546 may further include additional information such as providing time duration for maintaining trust to require the short-range communication device 502 to re-establish the two-way trust with the hub device 504 once the time duration expires. The time duration indicated by the trust message 546 prevent the connections between the short-range communication device 502 and the hub device 504 from becoming stale, even after the device mapping of the computer resource service provider 512 is updated to remove the hub device 504 as a trusted communication device for the short-range communication device 502.

In several embodiments, the trust message 546 can be encrypted by the computer resource service provider 512 using the cryptographic key 436 provided in the request of FIG. 4. In some embodiments, if the cryptographic key 436 provided in the request is a public cryptographic key, the computer resource service provider 512 encrypts the trust message 546 of the response 538. In other embodiments, if the cryptographic key 436 in the request is a symmetric cryptographic key that is additionally be encrypted with a public key provided by the computer resource service provider 512, the computer resource provider may decrypt the encrypted symmetric key in the request using the private key, then uses the symmetric key to encrypt the trust message 546 corresponding to the request submitted by the short-range communication device 502.

In one embodiment, the response 538 may be digitally signed by the computer resource service provider 412 by using digital signature 548. As illustrated above, digital signature 548 may include a signature component and a uniqueness constrained value. In some embodiments, the signature component and uniqueness constrained value collectively form a digital signature 548 generated using the ECDSA, such as discussed in the Federal Information Processing Standards Publication (FIPS) 186-4 and in ANSI X9.62, Public Key Cryptography for the Financial Services Industry: The Elliptic Curve Digital Signature Algorithm (ECDSA), 1999, which are incorporated herein by reference. For instance, the signature component and uniqueness constrained value collectively form a digital signature 548 for the digital signature algorithm (DSA), also discussed in FIPS 186-4, and other variations of the ElGamal Signature Scheme.

Figure 6:
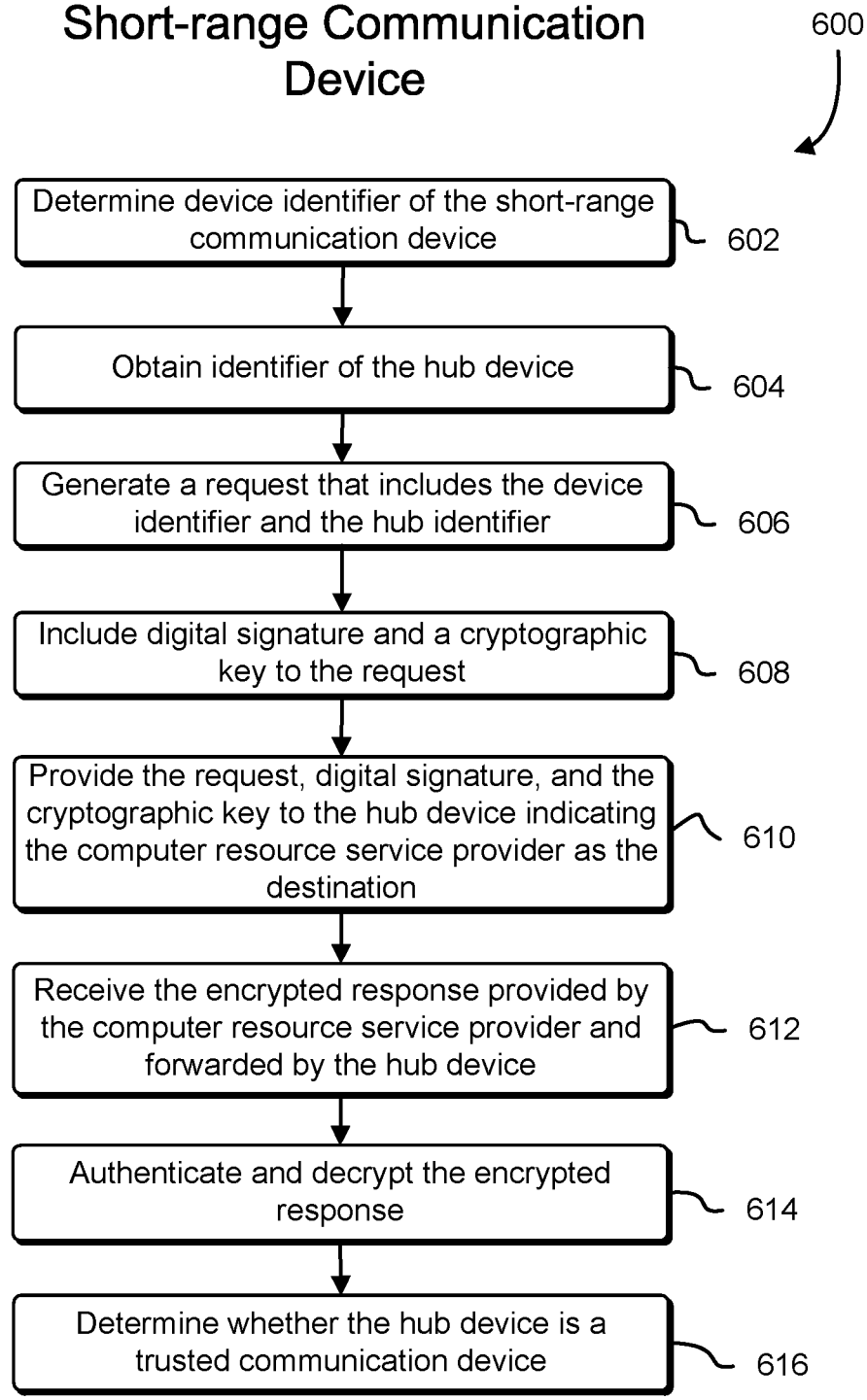
FIG. 6 illustrates an example flowchart for a short-range communication device to establish trust with another device in accordance with an embodiment.

FIG. 6 illustrates an example flowchart for a short-range communication device to establish trust with another device in accordance with an embodiment. The process 600 of FIG. 6 is initiated by the short-range communication device determining its identifier (step 602). The identifier of the hub device is also obtained (step 604). In this embodiment, the short-range communication device may detect that the hub device is broadcasting availability to accept connections, establishes an initial short-range communication channel established between the short-range communication device and the hub device, and submits an API call to obtain the hub identifier. At step 606, the short-range communication device generates a request that includes the determined device identifier and the hub identifier.

Once the request has been generated, the short-range communication device includes a digital signature and a cryptographic key (e.g., public key, encrypted symmetric key) to the request (step 608). As illustrated above, the cryptographic key is used by the computer resource service provider to encrypt the response intended for the short-range communication device and prevent access to the contents to response. In other embodiments, the short-range communication device digitally signs the request to prevent authenticate the request and prevent tampering by any intermediate devices. At step 610, short-range communication device provides the request and the cryptographic key to the hub device indicating the computer resource service provider as the final destination. In some embodiments, the request may include a header that indicates the source of the request and the destination port and IP address of the computer resource service provider, so that the hub device may simply forward the request rather than processing it. In one embodiment, the request is provided to the hub device using a short communication channel established between the short-range communication device and the hub device.

At step 612, the short-range communication device receives the encrypted response provided by the computer resource service provider and forwarded by the hub device. In one embodiment, the hub device receives the computer resource service provider through a separate network (e.g., WAN, WiFi, cellular service), then forwards the encrypted response to the short-range communication device through the established short-range communication channel (e.g., Bluetooth LE). At step 614, the short-range communication device authenticates and decrypts the encrypted response. As illustrated above in the preceding examples, the encrypted response may include an encrypted trust message that can be encrypted by the computer resource service provider using the cryptographic key provided with the request as illustrated in steps 608 and 610. In some embodiments, if the cryptographic key provided in the request is a public cryptographic key, the computer resource service provider encrypts the trust message of the response. In other embodiments, if the cryptographic key in the request is a symmetric cryptographic key that is additionally be encrypted with a public key provided by the computer resource service provider, the computer resource provider may decrypt the encrypted symmetric key in the request using the private key, then uses the symmetric key to encrypt the trust message corresponding to the request submitted by the short-range communication device. Based on the cryptographic operation of the computer resource service provider, the short-range communication device may decrypt the response using its own private key or a symmetric key identical to the one provided with the request. In one embodiment, the encrypted response may also be digitally signed by the computer resource service provider to prevent the message from being tampered by any intermediate devices, including the hub device forwarding the response message to the short-range communication device.

At step 616, the short-range communication device parses the decrypted content in the response and determines whether the hub device qualifies as the trusted communication device. If so, the short-range communication device may maintain the short-range communication channel and authorize the hub device to perform one or more operations on behalf of the short-range communication device. In other embodiments, the short-range communication device may disconnect from the initial connection and establishes a more persistent short-range communication channel after determining that the hub device is a trusted communication device. On the other hand, if the content indicates that the hub device cannot be trusted according to the computer resource service provider, the short-range communication device disconnects from the initial short-range communication channel. Process 600 terminates thereafter.

Figure 7:
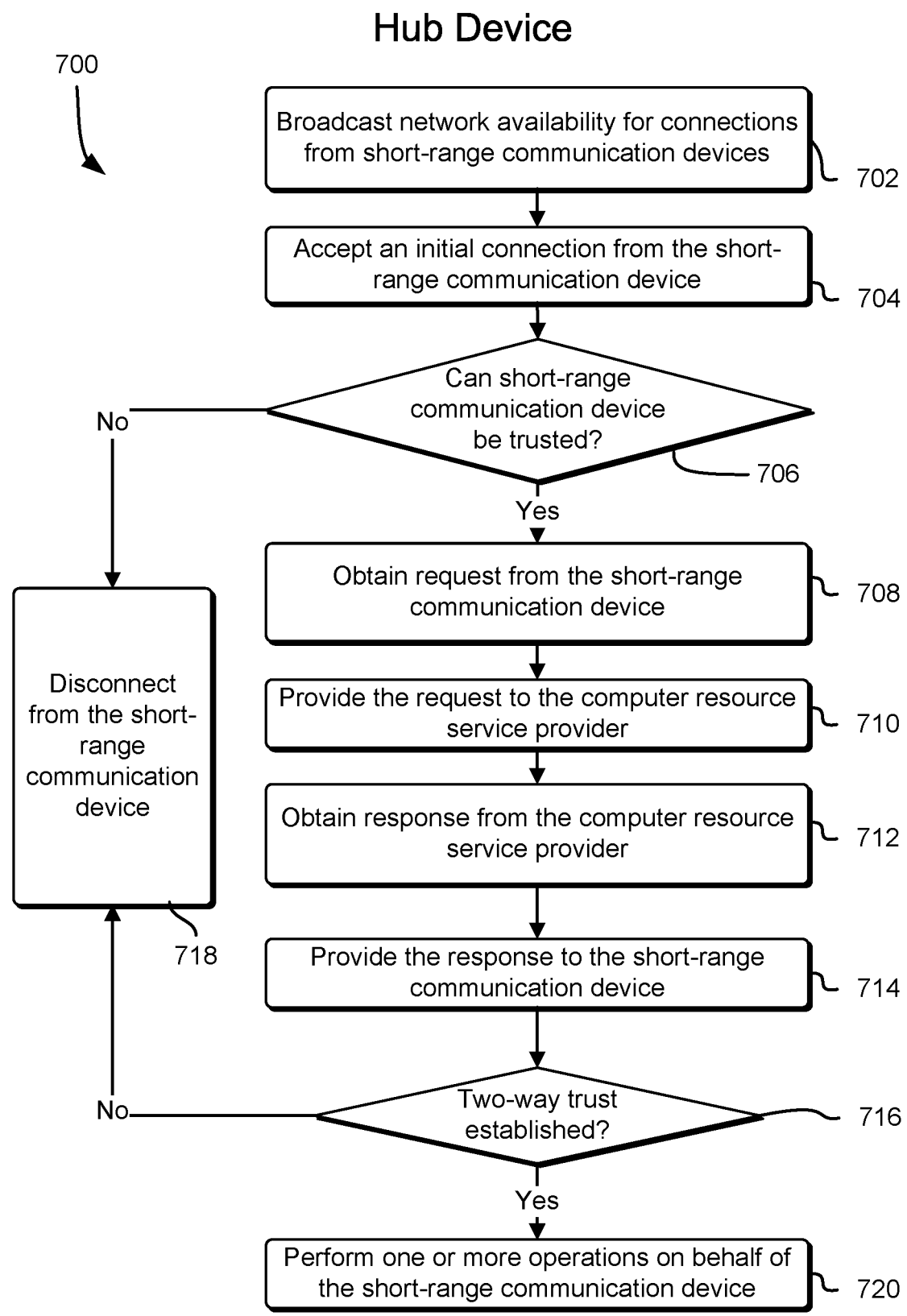
FIG. 7 illustrates an example flowchart for a hub device configured to be a proxy for establishing trust between devices in accordance with an embodiment.

FIG. 7 illustrates an example flowchart for a hub device configured to be a proxy for establishing trust between devices in accordance with an embodiment. The process 700 of FIG. 7 is initiated when the hub device broadcasts its network availability for accepting connections from short-range communication devices (step 702). In some embodiments, the hub device may broadcast its availability via a Universal Plug and Play (UPnP) network protocol, which is a standard that uses Internet and Web protocol s to enable devices such as PCs, peripherals, intelligent appliances, and wireless devices to be plugged into a network and automatically know about each other. In another embodiment, the hub device may broadcast its network availability by using a Link Layer Discovery Protocol (LLDP), which is a vendor-neutral link layer protocol in the Internet Protocol Suite used by network devices for advertising their identity, capabilities, and neighbors on an IEEE 802 local area network, principally wired Ethernet.

At step 704, the hub device accepts an initial connection from the short-range communication device. In some embodiments, the acceptance of the initial connection includes establishing a short-range communication channel (e.g., Bluetooth LE) that is different from the network channel established between the hub device and the computer resource service provider. At step 706, the hub device determines whether the short-range communication device can be trusted. In several embodiments, the hub device submits the device identifier of the short-range communication device and the identifier of the hub device to the computer resource service provider then obtains response from the computer resource service provider indicating whether the short-range communication device can be trusted from the hub device perspective. If it is determined that the hub device cannot trust the short-range communication device ("No" path of step 706), the hub device disconnects from the short-range communication device (step 718).

If it is determined that the hub device can trust the short-range communication device ("Yes" path of step 706), the hub device then obtains a request from the short-range communication device via the established short-range communication channel (step 708). At step 710, the hub device parses the destination information of the request and routes the request to the computer resource service provider. In several embodiments, the network used to forward the request to the computer resource service provider is different from the short-range communication channel established between the hub device and the short-range communication device. At step 712, the hub device obtains the response generated by the computer resource service provider. In several embodiments, the response is cryptographically protected and does not authorize the hub device to parse the contents within the encrypted response.

At step 714, the hub device provides the encrypted response to the short-range communication device through the short-range communication channel initially established at step 704. Once the short-range communication device receives and decrypts the response, the hub device may determine whether the trust has been established between the two devices. If the trust has not been established ("No" path of step 716), the hub device disconnects from the short-range communication device by terminating the established connection (step 718). Conversely, if it is determined that the trust has been established ("Yes" path of step 716), the hub device may perform one or more operations on behalf of the short-range communication device (step 720). For example, the hub device may configure the schedule during which short-range communication device should be activated. In another example, the hub device may obtain sensor data captured by the short-range communication device (e.g., temperature of the surroundings) and instruct the short-range communication device to adjust its current settings (e.g., raise the temperature of the thermostat). In several embodiments, the one or more operations performed by the hub device may be communicated via the established short-range communication channel. In other embodiments, the one or more operations performed by the hub device may be communicated via another channel which can be more secure than the initial connection since the trust has been established. Process 700 terminates thereafter.

Figure 8:
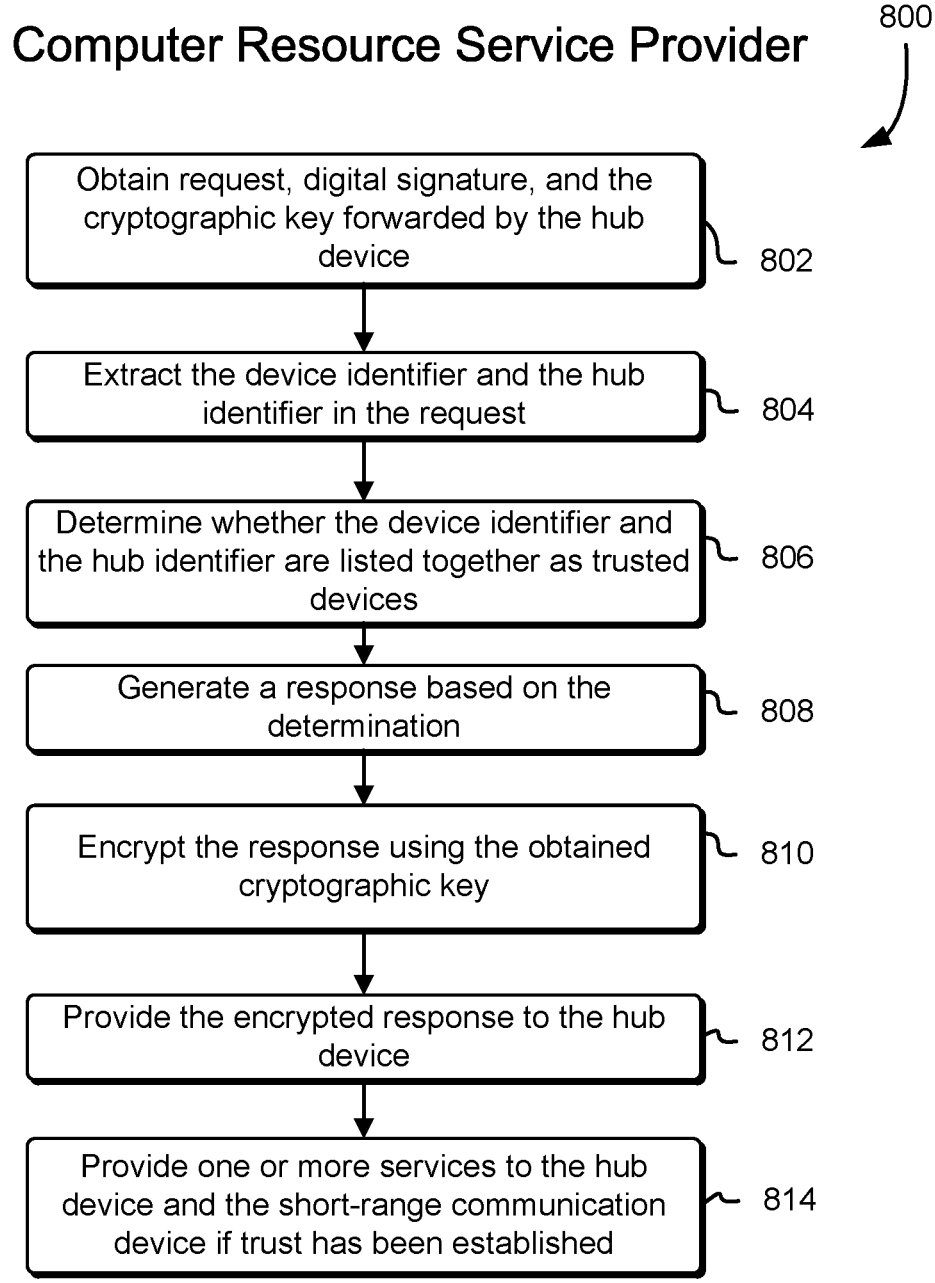
FIG. 8 illustrates an example flowchart for a computer resource service provider processing requests from short-range communication device to establish trust with another device in accordance with an embodiment.

FIG. 8 illustrates an example flowchart for a computer resource service provider processing requests from short-range communication device to establish trust with another device in accordance with an embodiment. The process 800 of FIG. 8 is initiated by the computer resource service provider obtaining the request, digital signature, and the cryptographic key forwarded by the hub device (step 802). In one embodiment, the header of the request indicates the short-range communication device as the source although the hub device provided the request to the computer resource service provider. In some embodiments, the request may be an API call in which a database query to identify the association between the hub device and the short-range communication device may be included. In several embodiments, the computer resource service provider performs one or more cryptographic operations on the request, including using the attached digital signature, to authenticate the request. At step 804, the computer resource service provider extracts the device identifier and the hub identifier in the received request. In some embodiments, the computer resource service provider may, before extracting the identifiers, authenticate the digital signature attached to the request to ensure that the content of the request has not been compromised.

Based on the device identifier and the hub identifier, the computer resource service provider determines whether they are listed together as trusted devices (step 806). In one embodiment, the computer resource service provider constructs a database query (e.g., SQL query, NoSQL query) using the device identifier and the hub identifier as parameters. The computer resource service provider then executes the query in the data store (e.g., data store 910 of FIG. 9) storing the device mappings between the short-range communication device(s) and the hub device(s). If there are positive results generated by the executed query, the computer resource service provider may determine that the hub device and the short-range communication device may trust each other. On the other hand, if the query returns no results or results indicating the devices should not trust each other, the computer resource service provider may determine that the hub device and the short-range communication device may not trust each other.

At step 808, the computer resource service provider generates a response based on the determination performed at step 806. The response may be response 538 of FIG. 5, which may include a trust message as well as a response header indicating the destination port and IP address of the short-range communication device. The computer resource service provider then encrypts the response using the cryptographic key forwarded by the hub device (step 810). As illustrated in FIG. 5, the computer resource service provider may perform different cryptographic operations based on the type of the cryptographic key provided by the short-range communication device. For example, if the cryptographic key provided in the request is a public cryptographic key, the computer resource service provider encrypts the trust message of the response. In another example, if the cryptographic key in the request is a symmetric cryptographic key that is additionally be encrypted with a public key provided by the computer resource service provider, the computer resource provider may decrypt the encrypted symmetric key in the request using the private key, then uses the symmetric key to encrypt the trust message corresponding to the request submitted by the short-range communication device. In another embodiment, the computer resource service provider may digitally sign the response so that the short-range communication device may authenticate the trust message of the response.

At step 812, the computer resource service provider may provide the encrypted response to the hub device. In several embodiments, the information in the response header indicating the destination IP address and the port of the short-range communication device allows the hub device to forward the response to the short-range communication device. Because the response generated by the computer resource service provider is encrypted and/or digitally signed, the hub device will be unable to access the trust message or modify the contents of the response. Based on the encrypted response, the short-range communication device and the hub device may establish a trust relationship. In that scenario, the computer resource service provider may provide one or more services to the hub device and the short-range communication device (step 814). For example, the computer resource service provider may provide a metering service in which data collected by sensors of the short-range communication device may be forwarded by the hub device to the computer resource service provider, which then provides a dashboard of the collected sensor data through a client application of a user device (e.g., hub device, a separate client device). Process 800 terminates thereafter.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the disclosure and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A hub device comprising:
one or more processors; and
memory comprising computer-executable instructions that, upon execution by the one or more processors, cause the hub device to:
obtain, via a first communication channel:
a request to establish a connection; and
a public cryptographic key from an Internet of Things (IoT) device,
wherein the public cryptographic key is:
encrypted using a shared cryptographic key shared between the IoT device and a computer resource service provider; and
digitally signed by the IoT device;
provide the request and the public cryptographic key to the computer resource service provider via a second communication channel;
obtain, from the computer resource service provider, a response that:
indicates that the hub device is a trusted communication device for the IoT device; and
is encrypted using the public cryptographic key provided by the IoT device;
forward the response to the IoT device; and
as a result of the IoT device confirming, based at least in part on the response, that the hub device is authorized to be the trusted communication device for the IoT device, broadcast availability to accept connections from IoT devices.

2. The hub device of claim 1, wherein the computer-executable instructions further comprise instructions that further cause the hub device to:
identify another IoT device connected with the hub device; and
as a result of determining that the connection has been established with the IoT device, operate as a gateway to communicatively connect the IoT device and other IoT device.

3. The hub device of claim 1, wherein the first communication channel is a short-range communication channel.

4. The hub device of claim 1 wherein the response includes authorization for the IoT device to establish the connection, the authorization being dependent at least in part on an identity of a manufacturer of the IoT device.

5. The hub device of claim 1, wherein the computer-executable instructions further comprise instructions that further cause the hub device to forward, to the computer resource service provider, a plurality of subsequent requests provided by the IoT device that indicate whether the connection should continue to be maintained.

6. The hub device of claim 1, wherein the instructions that cause the hub device to broadcast availability to accept connections further cause the hub device to broadcast the availability using Universal Plug and Play (UPnP) network protocol.

7. The hub device of claim 1, wherein the public cryptographic key is inaccessible to the hub device.

8. A computer-implemented method, comprising:
obtaining, from a short-range communication device via a short-range communication channel, a request to establish a connection with a hub device, the request:
including a public cryptographic key; and
being encrypted using a shared cryptographic key shared between the short-range communication device and a computer resource service provider;

providing the request and the public cryptographic key to the computer resource service provider;

obtaining, from the computer resource service provider via another communication channel different from the short-range communication channel, a response to the request that indicates that the hub device is a trusted communication device for the short-range communication device;

providing the response to the short-range communication device; and establishing, as a result of the short-range communication device confirming authorization of the hub device based on the response, availability to accept connections with the short-range communication devices.

9. The computer-implemented method of claim 8, wherein the response is an encrypted response that has been encrypted using the public cryptographic key.

10. The computer-implemented method of claim 8, wherein the request is digitally signed by the short-range communication device.

11. The computer-implemented method of claim 8, further comprising authorizing the short-range communication device to establish a second connection with another hub device based at least in part on the response.

12. A non-transitory computer-readable storage medium, comprising executable instructions that, as a result of being executed by one or more processors of an Internet-of-Things (IoT) device, cause the IoT device to at least:

obtain a first device identifier of the IoT device and a second device identifier of a hub device;

generate a request that includes the first device identifier and the second device identifier, the request generated to include first cryptographic material that is encrypted using second cryptographic material shared between the IoT device and a computer resource service provider;

provide, using a short-range communication channel, the request and the first cryptographic material to the hub device;

obtain, from the hub device, a response originated from the computer resource provider and cryptographically protected via the first cryptographic material; and as a result of a determination that the hub device can be trusted based at least in part on the response, authorize the hub device to transmit availability to connect with IoT devices.

13. The non-transitory computer-readable storage medium of claim 12, wherein the second device identifier is obtained from a broadcast of availability from the hub device indicating that the hub device is available to accept connections.

14. The non-transitory computer-readable storage medium of claim 12, wherein:

the first cryptographic material is a public cryptographic key; and the response is encrypted at least in part using the public cryptographic key.

15. The non-transitory computer-readable storage medium of claim 12, wherein the executable instructions further comprise instructions that further cause the IoT device to attach a digital signature to the request.

16. The non-transitory computer-readable storage medium of claim 12, wherein the executable instructions further comprise instructions that further cause the IoT device to transmit, through the short-range communication channel, program code to the hub device that, if executed, causes the hub device to transmit the availability to connect with the IoT devices.

17. The non-transitory computer-readable storage medium of claim 12, wherein the executable instructions further comprise instructions that further cause the IoT device to, in response to providing sensor data to the hub device, receive a command to adjust a setting of the IoT device.

18. The non-transitory computer-readable storage medium of claim 12, wherein the response further indicates a limit to an amount of time that the hub device can be trusted.

19. The non-transitory computer-readable storage medium of claim 12, wherein the response further indicates that the hub device is authorized to accept connections on behalf of the IoT devices.

20. The non-transitory computer-readable storage medium of claim 12, wherein the executable instructions further comprise instructions that cause the IoT device to:

after trust with the hub device is established, generate another request that indicates that the hub device is not authorized to continue accepting connections on behalf of the IoT devices; and terminate the short-range communication channel with the hub device.

* * * * *